United States Patent

[11] 3,630,394

| [72] | Inventor | Gary W. Kingzett<br>Milwaukee, Wis. |
|---|---|---|
| [21] | Appl. No. | 868,557 |
| [22] | Filed | Oct. 22, 1969 |
| [45] | Patented | Dec. 28, 1971 |
| [73] | Assignee | A-T-O Inc.<br>Butler, Wis. |

[54] CAM LEVER FOR ARTICLE HANDLING TRAY
3 Claims, 5 Drawing Figs.

[52] U.S. Cl. ........................................ 214/62 A, 198/155
[51] Int. Cl. ........................................ B65g 47/38
[50] Field of Search ........................... 214/62, 62 A; 198/155

[56] References Cited
UNITED STATES PATENTS
3,269,520  8/1966  Bishop et al. ............... 198/155
3,510,014  5/1970  Speaker et al. ............. 214/62 R

*Primary Examiner*—Robert G. Sheridan
*Attorney*—John K. Crump

ABSTRACT: A conveyor carriage for a commodity sorting system that has a tray pivotally mounted to a supporting truck and a releasable latch mechanism that normally holds the tray in a horizontal load carrying position. A cam member is pivoted on the underside of the tray which includes two distinct inclined surfaces. The first surface is a short incline at the leading part of the member that is disposed at a relatively steep angle with respect to the direction of movement of the carriage, and the second surface presents a curve which has its leading portion tangential to the direction of movement of the tray and then descends in an increasing slope along the rest of its length. A tray tipping tilt arm is mounted in the path of travel of the carriage to engage the cam member and raise it for first releasing the latch mechanism, and then tilting the tray with a controlled acceleration that facilitates discharge of commodities from the tray.

PATENTED DEC 28 1971
3,630,394
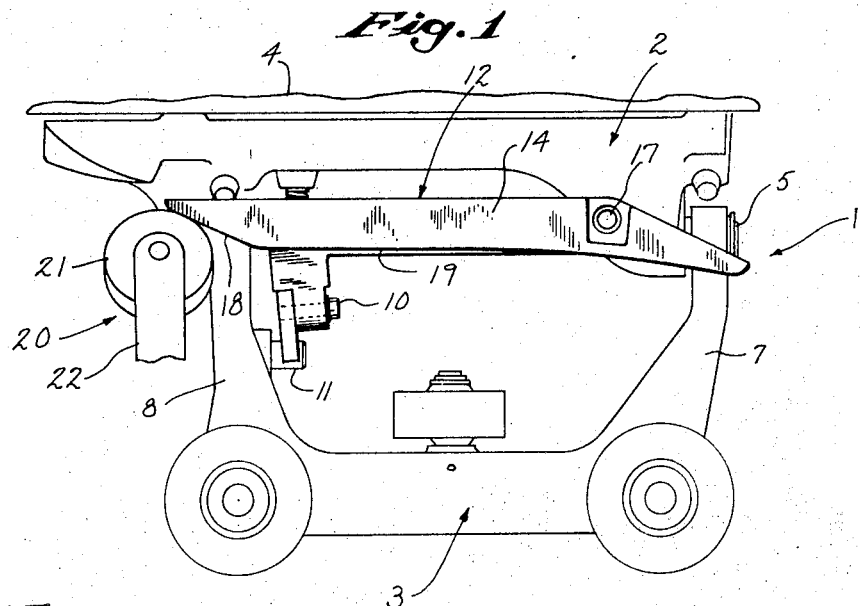
Fig.1
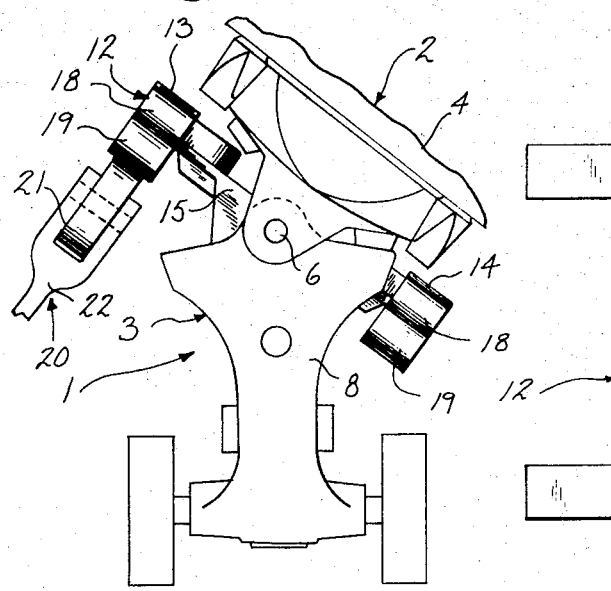
Fig.2
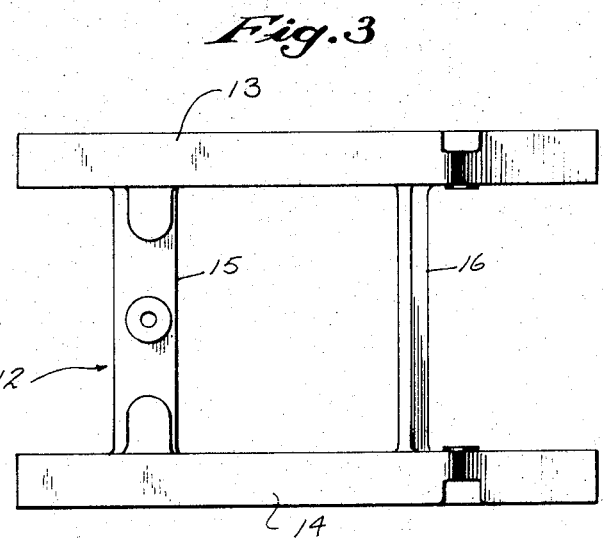
Fig.3
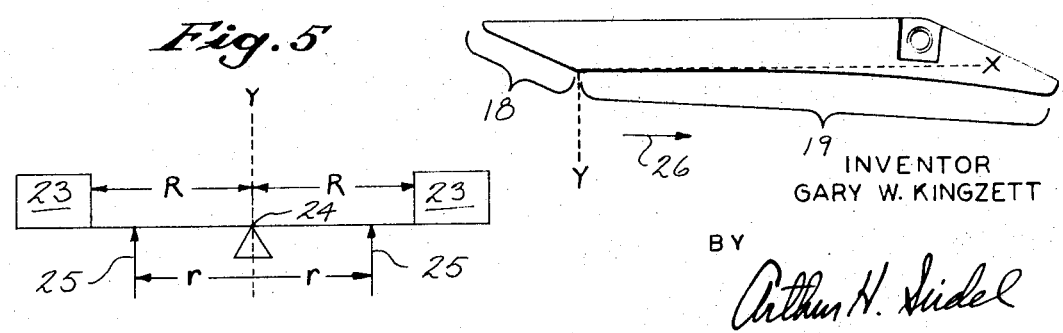
Fig.5
Fig.4
INVENTOR
GARY W. KINGZETT
BY
Arthur H. Seidel
ATTORNEY

CAM LEVER FOR ARTICLE HANDLING TRAY

CROSS-REFERENCES TO RELATED APPLICATIONS

This is an improvement on the copending application, Ser. No. 672,162, filed Oct. 2, 1967, now U.S. Pat. No. 3,510,014, and entitled "Conveyor System."

BACKGROUND OF THE INVENTION

This invention relates to a conveyor carriage, for use in a conveyor system, that has a load carrying tray mounted for pivotal movement between a load carrying position and a load discharging position. Automatic conveying and sorting devices for which the carriage is adapted are illustrated in the foregoing cited patent application and in U.S. Pat., No. 3,034,665 issued to Richard L. Speaker on May 15, 1962. In these illustrated systems for transporting commodities from one or more loading stations to a plurality of preselected receiving or discharging stations the commodities are loaded onto a series of trays, which are each connected to and locked in a horizontal position on a supporting truck moving along an endless path to discharge stations. A pneumatically actuated tray tipping member mounted alongside the path is raised to engage a cam member on the underside of a tray, to first unlatch the tray from its horizontal position, and then to tilt the tray to discharge the commodity at the desired discharge station.

Sorting conveyors of the type under discussion have numerous applications, each requiring rapid and reliable transportation of commodities from a loading station to one of any number of unloading stations. Such conveyors are used in airport terminals to sort baggage, in post offices to sort mail, and in mail order houses or parts depots to collect items from or deliver items to storage bins. Thus, a system must be capable of handling items of all shapes and sizes which are placed on the trays for conveying and sorting. The speeds at which present day conveyors operate allow them to transport these various shaped items quite adequately. However, as the speed of the conveyor carriages is increased, in order to increase the capacity of the sorting system, difficulties arise with present systems in discharging items from the trays at the unloading stations. For example, when the cam member on a high-speed tray impacts with a tray tipping member, the transported item is sometimes thrown from or tumbled on the tray by the impact forces that occur, causing damage to the item or confusion at the unloading station. Alterations in the designs of trays and unloading stations have reduced the problem to some extent, but as increased speeds are needed to increase conveyor capacity other improvements in tray operation are needed to insure smooth unloading.

Guide rails with generally curved surfaces have been used to control the tilting action of conveyor trays, as disclosed in the U.S. Pat. by Bishop, No. 3,269,520. Such construction is not applicable, or complete when applied to the type of conveyor system disclosed herein.

SUMMARY OF THE INVENTION

It is a general object of this invention to provide an improved cam for controlling tray tilting motion in high speed, conveyor sorting systems. The invention embodies the use of a nonlinear, or curved cam surface, in place of the straight ramp, or linear cam, used in present systems. More specifically, the invention resides in a cam surface which is tangential to the direction of relative movement of the cam and tilting arm at the point on the cam surface which initiates tilting of the tray, and this surface increases in slope along its length. The improved cam eliminates the momentary high acceleration imparted to the tray and items carried by it caused by the impact of the cam and tilting member when engaging one another at high speeds. The improved cam imparts a relatively constant acceleration to the tray as the cam member rides across the tilting member, and it is a discovery that a constant acceleration minimizes tipping and lifting of items off the tray, which otherwise cause them to tumble when making contact with the unloading station.

It is the general object of the invention to improve the tilting motion of the tray of a conveyor carriage during unloading, thus allowing the items to smoothly slide off the tray without being thrown or tumbled. It is a further object to obtain this improved unloading while keeping the forces exerted by the cam member on the tilting arm at a minimum. It is still a further object to provide a cam member which improves unloading that is easy and inexpensive to manufacture, and which is fully compatible with existing conveyor systems.

The foregoing and other objects and advantages of this invention will appear from the following description, in which description reference is made to the accompanying drawing which shows by way of illustration and not of limitation a preferred embodiment of the invention. Such embodiment does not represent the full scope of the invention, rather the invention may be employed in a variety of embodiments, and reference is made to the claims herein for interpreting the breadth of the invention.

BRIEF DESCRIPTION OF THE DRAWING

FIG. 1 is a side view of a conveyor carriage with part of the upper portion of the tray broken away;

FIG. 2 is a front end view of the carriage of FIG. 1 showing the tray in a tilted position;

FIG. 3 is a top view of the cam member that forms a part of the carriage;

FIG. 4 is a side view in elevation of the cam member; and

FIG. 5 is a schematic diagram of a tray supporting a load.

DESCRIPTION OF THE PREFERRED EMBODIMENT

A conveyor and sorting system of the type in which the present invention may be employed may consist of a plurality of carriages comprising trays mounted upon wheeled trucks. These carriages are driven along an endless track running between loading and unloading stations, and the invention resides in a component of these carriages. Such a carriage 1 is shown in FIGS. 1 and 2, with a tray 2 pivotally mounted on a wheeled truck 3 for tilting movement around a fore and aft axis. The upper part of the tray 2 comprises a relatively large platform 4 to support items that are to be transported, and only a fragmentary part is shown for purposes of illustration. The tray 2 has a rear trunnion 5, shown in FIG. 1, and a forward trunnion 6, shown in FIG. 2, which pivotally support the tray 2 on the upwardly extending arms 7 and 8 of the truck 3. The truck 3 is connected to other similar trucks by conveyor chain and is transported along a conveyor track (not shown in the drawing) in a manner as described in said copending application.

In FIG. 1, the tray 2 is shown locked in a horizontal, commodity transporting position by a releasable latch mechanism 10 that includes a pin 11 on the truck arm 8. The latch mechanism 10 is mounted on the underside of a cam member 12, and the construction of this mechanism is shown in more detail in said copending application, since its construction is not a part of the present invention. Suffice to say here, that the cam member 12 is pivotally mounted to the rear of the tray 2, and whenever the forward portion of the cam member 12 is lifted upward a sufficient distance the latch mechanism 10, is released from the pin 11 and the tray 2 is then free to tilt about the trunnions 5 and 6.

As shown in FIG. 3, the cam member 12 includes a pair of laterally spaced lever members 13 and 14 for location on opposite sides of the pivotal axis of the tray 2 defined by trunnions 5 and 6. Lever members 13 and 14 are elongate in shape and extend in the path of travel of the carriage 1. They are connected by a pair of cross braces 15 and 16, and the underside of the front cross brace 15 mounts the latch mechanism 10. Each lever member 13, 14 is hinged to the tray 2 near its after end by a pivot shaft 17, to obtain the aforesaid vertical movement of the cam member 12. The underside of each lever member 13, 14 is characterized by a cam or bearing surface consisting of a forward, release portion 18 and a tipping portion 19, as shown most clearly in FIG. 4.

Each of the unloading stations of a conveyor system is provided with a tipping member 20 mounted alongside the conveyor track. As shown in FIGS. 1 and 2, the tipping member 20 consists of a roller 21 supported by a tip-up arm 22, only part of which is shown. The tip-up arm 22 is pivotally anchored to a frame on the conveyor track and is moved upward into the position shown in FIGS. 1 and 2 by an air actuated cylinder (not shown). The details of this structure are also shown and described in said copending application. When the tipping member 20 is raised the roller 21 is positioned in the path of travel of the cam surfaces 18, 19, so that it will bear against one of the surfaces of the lever members 13, 14 extending out on a side of the tray 2.

Referring to FIG. 1, the forward direction of the carriage 1 (to the left) causes the lever member 14 of the cam member 12 to ride up and pass over the raised tipping member 20. The release portion 18 of the cam surface on the lever member 14 presents a relatively steep slope, which causes the front of the cam member 12 to pivot rapidly upwardly about the pivot shaft 17 as the release portion 18 of the surface rides up and over the roller 21. This motion releases the latch mechanism 10, allowing the tray 2 to be tipped sidewardly about the trunnions 5 and 6 by application of an upward force on the cam surface.

In FIG. 2, the tray 2 is shown in the tipped position, resulting from the upward force imparted to the tipping member 20 on the tipping surface 19 of the lever member 14, as the member 14 rides up and over the roller 21. Because the forward motion of the carriage is relatively constant, the rate at which the tray 2 is tipped is determined by the contour of the tipping surface 19 of the cam lever 14.

The contour of the tipping surface 19 constitutes the improvement in which the discovery of the present invention resides. This discovery is best explained by reference to FIG. 5, constituting a schematic end view of the tray 2 in which the tray 2 is supporting boxes 23 at a distance R from the pivot point 24. The force vectors 25 represent the necessary force on either of the lever members 13 or 14 at a distance $r$ from the pivot point 24 to tip the tray. The pivot point 24 is a schematic representation of trunnions 5, 6.

To prevent tipping or bouncing of the boxes 23, the portion of the tray 2 supporting the boxes 23 must not be withdrawn from under the boxes 23 at a rate exceeding that of a free-falling object. This limitation on movement insures that the boxes 23 follow and maintain contact with the tray 2 when it is being tipped from its horizontal position. Designating the vertical direction Y, the equation for a free-falling box 23 is:

$$Y = \tfrac{1}{2} g t^2 \text{ (wherein } g = \text{acceleration of gravity and } t = \text{time)}$$

This equation determines a limit on the rate of movement of the tray 2 at a distance R from the pivot point 24. It follows that the limit on the rate of movement at a distance $r$ from the pivot point 24 is a proportional amount of the movement at distance R, thus:

$$Y = \tfrac{1}{2}(r/R) g t^2$$

In FIG. 4, the lever member 14 is shown with reference axis X and Y intersecting at the point on the cam surface where the tipping member 20 commences to apply a vertical tipping force. The velocity vector 26 represents the direction of movement of the lever member 14 and carriage 1 along the X axis. The carriages are driven at a constant speed V, along the conveyor track, so that: $X = Vt$ or $t = X/V$ The shape of the tipping portion 19 of the cam surface is therefore limited by the equation:

$$Y = \tfrac{1}{2}(r/R)(g/V^2) X^2$$

For any given set of circumstances the equation is:

$$Y = \tfrac{1}{2} K X^2 \text{ (where } K = \text{a constant} = (r/R)(g/V^2))$$

The slope of the tipping portion 19 of the cam member surface is the first derivative of this equation.

$$dY/dX = KX$$

At the point where tipping commences, $X=0$ and from this equation it is observed that the slope is 0. The cam member surface should, therefore, be tangential to the X axis at this point.

The second derivative of the same equation shows that the slope of the cam surface can then be increased at a constant rate along the remainder of the tipping portion 19 without causing a tumbling or throwing of the boxes 23.

$$d^2Y/dX^2 = K$$

This constant, $K$, is only constant for any set of circumstances where the carriage 1 is driven at a constant speed, and a box 23 is placed on the tray 2 at a known distance R. In practice, of course, the value of R can vary considerably depending on where the box 23 is placed on the tray 2, and consequently the value of $K$ varies. The design objective is to provide that the tipping cam surface 19 is shaped so that within limits of size allowed for the tipping portion 19, carriage speed can be maximized. To accomplish this, the tipping portion should preferably be shaped according to the formula:

$$Y = \tfrac{1}{2} K X^2 \text{ (where } K \text{ is minimized as much as possible)}$$

In the preferred embodiment of the invention shown in FIGS. 1 and 2, it is desirable to tilt the tray 2 25° to unload the items being transported. This requires that the tipping portion 19 of the lever members 13 and 14 move about 2 inches vertically, the Y direction, in order to produce this amount of tipping of the tray 2. The lever members 13 and 14 are limited in length in the X direction to about 18 inches in the preferred embodiment shown. Substituting these values into the equation for the tipping surface the value of K is determined.

$$\text{at } Y=2 \text{ inches } X=18 \text{ inches} \implies 2 = \tfrac{1}{2} K (18)^2$$

$$\text{therefore: } K = 0.0123$$

Using this constant the shape of the desired tipping portion 19 of the cam surface can be constructed. In practice, it has been discovered that the surface of the tipping portion 19 defined by this resulting equation, $$Y = \tfrac{1}{2}(0.0123) X^2$$

varies less than 1 percent from a surface defined by the arc of a circle with a radius of 64 inches. The 1 percent error is not substantial, and the circular-shaped surface is easier and more economical to manufacture.

The value of K in the embodiment shown is 0.0123. A lower value could be obtained if a longer cam surface were used, with the consequence that a higher carriage speed could be obtained before tumbling or throwing occurred. However, within any given limitation on cam member length, a value of K determined by and used in the equation derived above, will maximize the carriage speed allowable for smooth unloading.

This solution to the problem encountered in unloading items from a conveyor sorter is by no means exhaustive. The consideration of such factors as the shape of the items being conveyed, their positioning on the tray and the effects of flexing in the tray result in solutions which are very complex and impractical to make. The inventor has made a very practical approach to the problem and provided a solution which substantially improves performance while keeping the cost of production within competitive limits.

In essence the invention shows that to achieve smooth unloading the tipping portion 19 of the cam surface should start out nearly tangential to the direction of motion of the carriage, and that it can increase in slope along the length of the cam at a nearly constant rate necessary to get the desired amount of tipping.

I claim:

1. In a cam member for a conveyor carriage having a truck movable along a track with a load supporting tray pivotally mounted on the truck for lateral tilting movement, such carriage being used in conjunction with tray tipping members stationed along the track, the combination of:

a lever arm attached to said tray in a position to be struck by a tipping member and cause tilting movement of the tray; and a surface on said lever arm extending in the direction of movement of the carriage for engagement with such a tipping member, which surface is substantially tangential to the direction of travel at the point of engagement that initiates lateral tilting of said tray, and which presents a continuously increasing slope to a tipping member along the length of the surface as said lever arm passes across the tipping member.

2. A cam member of claim 1 wherein the increasing slope of said surface defines a circular arc along its length.

3. In a cam member for a conveyor carriage having a truck movable along a track, a load supporting tray pivotally mounted on the truck for lateral tilting movement, and a latch mechanism for normally retaining the tray in a load carrying position, such carriage being used in conjunction with tray tipping members stationed along the track, the combination of:

a lever member pivoted to said tray for vertical swinging movement with respect to the tray, which lever member is adapted to be struck by a tipping member;

a portion on said lever member mounting a part of said latch mechanism such that a vertical upward movement of said lever member unlatches the mechanism;

a first cam surface on said lever member extending in the direction of movement of the carriage for engagement with a tipping member and that is of a relatively steep slope to raise the lever member to unlatch said mechanism; and a second cam surface on said lever member that is an extension of said first surface in the direction of carriage movement which is of a relatively lesser slope to raise the lever member and tilt said tray, such second surface being curved with an initial part substantially tangential to the direction of movement and having a continuously increasing slope thereafter.

* * * * *